Sept. 29, 1931.  J. L. GILMORE  1,825,268
SPARE TIRE CARRIER
Filed March 3, 1930
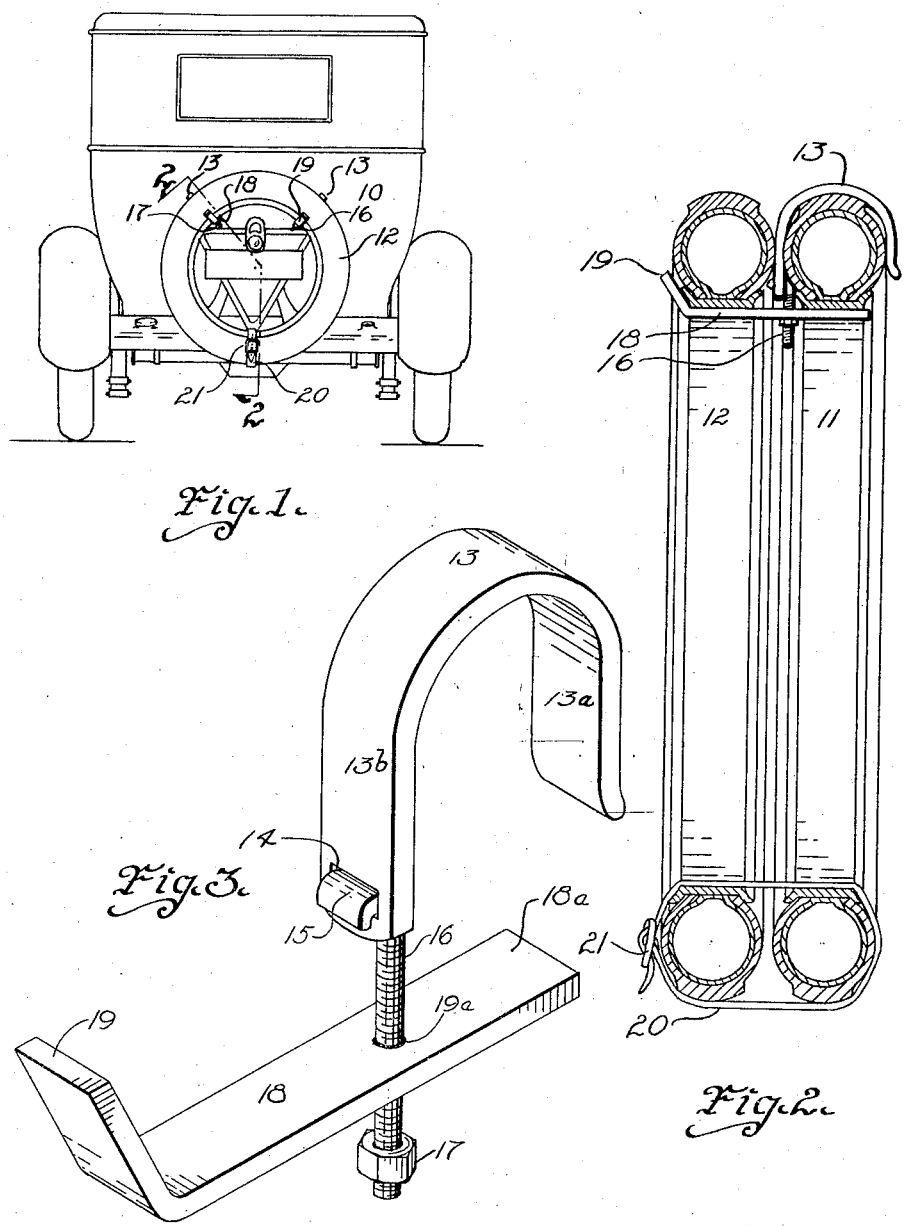

Patented Sept. 29, 1931

1,825,268

UNITED STATES PATENT OFFICE

JOHN L. GILMORE, OF KANSAS CITY, MISSOURI

SPARE TIRE CARRIER

Application filed March 3, 1930. Serial No. 432,683.

My invention is of a spare tire carrier.

More particularly, it is the purpose of my invention to provide a spare tire carrier of extremely simple, compact, inexpensive and durable construction, which can be quickly and easily installed and assembled for use.

Another object of my invention is to provide such a spare tire carrier of the type having a member adapted to hang over one tire already mounted on a car and to conveniently support a second spare tire by means of an element supported underneath the upper portion of the second spare tire and having an element projecting underneath a portion of the first spare tire.

A further object is to provide such a spare tire carrier capable of convenient and easy adjustment for adapting the carrier to tires of different sizes.

With these and other objects in view, my invention consists in the construction, arrangement and combination of the various parts of my spare tire carrier, whereby the objects contemplated are attained, as hereinafter more fully set forth, pointed out in my claims, and illustrated in the accompanying drawings, in which:

Figure 1 shows a rear elevation of a motor vehicle equipped with spare tire carriers embodying my invention.

Figure 2 is a vertical, central, transverse, sectional view through two spare tires taken on the line 2—2 of Figure 1; and Figure 3 is a perspective view of one of the spare tire carriers.

In the drawings herewith, I have used the reference numeral 10 to indicate a motor vehicle having supported thereon a spare tire 11 in any suitable manner. My present invention is intended for supporting another spare tire 12 upon the tire 11.

My carrier includes a member which for convenience I will call the hanger member 13 having substantially the form of an inverted U, as shown in Figure 3. The hanger member 13 may be of strap iron or any suitable material preferably having some slight resiliency and is intended to rest over the tread portion of the tire 11.

What is then the outer arm 13a of the hanger member 13 is slightly longer than the inner arm 13b and is provided at its lower end with a notch 14.

Preferably the notch 14 is substantially rectangular and transversely elongated as shown.

I provide a hook 15 adapted to be detachably received in the notch 14 as best illustrated in Figure 3. The hook member preferably is made of a flat piece of metal bent to shape. Extending downwardly from the hook member is a shank 16 threaded to receive a nut 17.

What I shall for convenience call a supporting member 18 has between its ends a hole 19a through which the shank 16 loosely but rather snugly extends.

At one end the supporting member 18 has an upwardly and outwardly inclined portion 19.

In the use of my spare tire carrier, I preferably employ two of the complete carriers at the upper parts of the spare tires and spaced on opposite sides of the vertical centers thereof, as illustrated in Figure 1.

The hanger members 13 are hung over the tread portion of the forward spare tire 11, as seen for instance in Figure 2. This can be done before or after the hook member 15 is inserted through the slot or notch 14.

The nut 17 is then tightened until the projecting end 18a of the supporting member 18, which does not have the inclined portion 19 rests snugly against the under side of the rim of the spare tire 11 for tight engagement therewith.

The spare tire 12 can then be lifted up and hung over the supporting members 18 of the two installed spare tire carriers.

The tire 12 will then hang in the position shown in Figure 2.

It will, of course, be understood that ordinary lock washers may be used on the shank 16.

I preferably put an ordinary strap 20 around both tires 11 and 12 at their lower parts as illustrated in Figures 1 and 2. The strap is provided with a buckle 21. Instead of the strap, one of my carriers may be used.

The rear spare tire 12 may be carried until it is needed, and then when it is desired to remove it, the strap 20 or the lowermost carrier, as the case may be, is removed, and the tire 12 can be simply lifted off the spare tire carriers.

It will be noted that when this has occurred the spare tire carriers will still be snugly held in place and can not be accidentally lost or dropped off.

It will be seen from the foregoing that the objects heretofore mentioned have been attained in the present tire carrier. The device is extremely simple of construction. The material, of course, is readily available for manufacture and the manufacturing processes are easily and quickly performed without the necessity for any complicated machinery.

A very minimum of material is used for accomplishing the desired purpose. The carriers may be quickly, readily and easily installed for use. All that is necessary to remove them entirely is to loosen the nuts 17 and take off the carriers. They are of light weight and can be readily carried in the ordinary tool box, occupying very little space. They are easily adjustable so as to snugly fit tires of different sizes.

When the nut 17 is tightened to draw the portion 18a of the supporting member against the inner face of the rim of the tire 11, the main portion of the supporting member 18 is leveled up.

It will, of course, be understood that the provision of the adjustment means of the nut 17 affords means for locking the carrier firmly on the tire 11.

Some little play of the shank 16 in the hole 19a is provided for so as to allow the ready and easy adjustment and manipulation of the parts in installation and to prevent binding.

Changes may be made in the details of the construction and arrangement of my tire carrier in the materials to be used and the mode of securing the adjustment without departing from the real spirit and purpose of my invention, and it is my intention to cover by my claims, any modified forms of structure or use of mechanical equivalents, which may be reasonably included within their scope.

I claim as my invention:

1. In a spare tire carrier, a U-shaped member adapted to fit over the tread of the upper portion of a tire, a substantially straight member adapted to engage the inner face of a rim carrying such tire, said straight member having a part projecting laterally to support a second rim and provided with means for engaging the side of the second rim farther from the U-shaped member, means adapted to project between the rims for adjustably connecting said members together and gripping the first rim and its tire between such members.

2. In a spare tire carrier, a member adapted to fit over the tread of the upper portion of a tire, a substantially straight member adapted to engage the inner face of a rim carrying such a tire, said substantially straight member having a part projecting laterally to support a second rim and provided with means for engaging the side of the second rim farther from said first member, a third member pivotally connected with said first member and having an adjustable connection with the second member and adapted to project between said rims for clamping the first rim and its tire between said first two members, so that said laterally projecting part may support a second spare tire.

3. In a spare tire carrier, a member adapted to fit over the tread of the upper portion of a tire, a substantially straight member adapted to engage the inner face of a rim carrying such a tire, said substantially straight member having a part projecting laterally to support a second rim and provided with means for engaging the side of the second rim farther from said first member, a third member pivotally connected with said first member and having the second member rotatably mounted on it, and means carried by the third member for causing the first rim and its tire to be gripped between the first and second members with said laterally projecting part standing in position for receiving and supporting a spare tire rim.

4. In a spare tire carrier, a member adapted to fit over the tread of the upper portion of a tire, a substantially straight member adapted to engage the inner face of a rim carrying such a tire, said substantially straight member having a part projecting laterally to support a second rim and provided with means for engaging the side of the second rim farther from said first member, a third member connected with said first member and adapted to project between such a pair of rims, the third member having the second member slidably mounted on it, and means carried by the third member for clamping said rim and said tire between said first and second member with such part projecting for supporting the spare tire rim.

5. In a tire carrier, a U-shaped member adapted to fit over the upper tread portion of a spare tire, a flat member adapted to engage the under face of a rim carrying such tire radially inwardly from said first member, said flat member having a laterally projecting portion adapted to support a second spare tire and rim and provided with an up-turned end for engaging the side of the second spare tire rim farther from the U-shaped member, a third member having a pivotal connection with one arm of said U-shaped member and adapted to project between the rims of such spare tires and having a threaded portion projected through said substantially flat member for permitting the flat member to slide and rotate on the third member, and a nut on said threaded portion.

Des Moines, Iowa, February 22, 1930.

JOHN L. GILMORE.